US012626872B2

(12) United States Patent
von Arx et al.

(10) Patent No.: US 12,626,872 B2
(45) Date of Patent: May 12, 2026

(54) CIRCUIT BREAKER LINEAR LEVER AND TRIPPING FORK MECHANISM

(71) Applicant: Rockwell Automation Switzerland GmbH, Aarau (CH)

(72) Inventors: Rahel J. von Arx, Schinznach-Dorf (CH); David J. Urech, Mellingen (CH); Ulrich Weber, Aarau (CH); Sadashiv Pimple, Zuchwil (CH)

(73) Assignee: Rockwell Automation Switzerland GmbH, Aarau (CH)

( * ) Notice: Subject to any disclaimer, the term of this patent is extended or adjusted under 35 U.S.C. 154(b) by 212 days.

(21) Appl. No.: 18/505,967

(22) Filed: Nov. 9, 2023

(65) Prior Publication Data

US 2025/0157747 A1 May 15, 2025

(51) Int. Cl.

*H01H 1/14* (2006.01)
*H01H 3/38* (2006.01)
*H01H 9/20* (2006.01)

(52) U.S. Cl.

CPC ................ *H01H 1/14* (2013.01); *H01H 3/38* (2013.01); *H01H 9/20* (2013.01)

(58) Field of Classification Search

CPC .. H01H 1/14; H01H 3/38; H01H 9/20; H01H 2071/042; H01H 71/04; H01H 71/40
See application file for complete search history.

(56) References Cited

U.S. PATENT DOCUMENTS 2,795,670 A 6/1957 Cellerini et al.
2,813,167 A 11/1957 Bingenheimer et al.
3,665,360 A 5/1972 Norden
7,570,146 B2 8/2009 Mills et al.
9,711,307 B2 7/2017 Weiden
11,031,191 B2 6/2021 Pinero
2009/0128077 A1 5/2009 Kawata et al.
2020/0027678 A1* 1/2020 Gibson .................... H01H 9/24
2025/0118516 A1 4/2025 Cho
2025/0157772 A1* 5/2025 Urech ................ H01H 71/2472

FOREIGN PATENT DOCUMENTS

DE 102008020453 A1 10/2008
IT 1101591 B 10/1985
JP 2002298723 A 10/2002

OTHER PUBLICATIONS

Non-final Office Action issued by the USPTO in U.S. Appl. No. 18/505,989 on Oct. 22, 2025, 25 pages.

* cited by examiner

*Primary Examiner* — Lheiren A Caroc

(57) ABSTRACT

Various embodiments of the present technology generally relate to industrial circuit breakers. More specifically, a linear lever and tripping fork mechanism for thermal-magnetic circuit breakers is disclosed that provides information in the event of a trip about what caused the trip (i.e., overload or short circuit). In an embodiment, a circuit breaker includes a tripping fork that pivots in response to a thermal trip occurring in the device. In response to the tripping fork pivoting, a linear lever slides into a trip indication position. In response to the linear lever sliding into the trip indication position, trip indication componentry provides an indication that the thermal trip occurred to an output on the circuit breaker. The circuit breaker further includes a second tripping fork and linear lever that behave similarly in response to a magnetic trip occurring in the device.

20 Claims, 12 Drawing Sheets

CIRCUIT BREAKER LINEAR LEVER AND TRIPPING FORK MECHANISM

INCORPORATIONS

The following U.S. Patent Applications, each of which are filed concurrently with the present application, are incorporated by reference herein in their entireties for all purposes: U.S. patent application Ser. No. 18/505,948, titled "CIRCUIT BREAKER INTERLOCK MECHANISM"; U.S. patent application Ser. No. 18/505,989, titled "CIRCUIT BREAKER TRIPPING MECHANISM"; and U.S. patent application Ser. No. 18/506,006, titled "CIRCUIT BREAKER COMPENSATION BIMETAL OF A THERMAL TRIPPING MECHANISM." Each of the applications describe features of a circuit breaker, all of which can be incorporated into a single circuit breaker to obtain the benefit of each of the described features.

TECHNICAL FIELD

Various embodiments of the present technology generally relate to features of circuit breakers used in industrial automation environments. More specifically, embodiments of the present technology include a tripping fork and linear lever mechanism that provides an indication as to whether a thermal trip or magnetic trip occurred in an industrial automation circuit breaker.

BACKGROUND

Circuit breakers are electrical switching devices designed to protect electrical circuits from potential damage that can be caused by short circuits or overloads. Circuit breakers may be implemented in industrial environments as components of electrical circuits. The basic purpose of a circuit breaker is to stop the flow of current during fault conditions or overload situations. Different types of circuit breakers may be used depending on the needs of a particular system. Circuit breakers may use various components for detecting trip conditions. One common type of circuit breaker is the thermal-magnetic circuit breaker.

A thermal-magnetic circuit breaker combines the functions of a thermal circuit breaker and a magnetic circuit breaker. A thermal circuit breaker protects against overcurrent using a bimetallic strip that deforms as it heats up, causing a mechanical displacement that eventually trips the device. A magnetic circuit breaker protects against short circuits using a magnetic coil, whose large magnetic field produced by large spikes in current breaks the circuit.

Thus, a thermal-magnetic circuit breaker is responsive to both small overloads that persist for too long and large spikes in current (short circuits). However, the inner componentry of circuit breakers is typically not exposed and therefore not visible to operators or other personnel who may wish to know what caused the device to trip (i.e., overload or short circuit). Nonetheless, information pertaining to what caused the circuit breaker to trip may be useful to such operators or other personnel. Systems and methods to provide this information exist but lack convenience, reliability, and flexibility.

It is with respect to this general technical environment that aspects of the present disclosure have been contemplated. Furthermore, although a general environment is discussed, it should be understood that the described examples should not be limited to the general environment identified in the background.

SUMMARY

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to features of thermal-magnetic circuit breakers. More specifically, embodiments of the present technology include a tripping fork and linear lever mechanism that provides an indication as to whether a thermal trip or magnetic trip occurred in a circuit breaker. In an embodiment of the present technology, a circuit breaker includes a tripping fork, a linear lever, trip indication componentry, and an output. The tripping fork has a contact surface and shifts between a no-trip position and a tripped position. The no-trip position is in a first plane and the tripped position is in a second plane different than the first plane. The contact surface physically contacts a first end of the linear lever in the no-trip position and does not physically contact the first end of the linear lever in the tripped position. The contact surface of the tripping fork physically contacts a first end of the linear lever when the tripping fork is in the no-trip position. The linear lever slides in a third plane in a first direction into a trip indication position in response to the tripping fork shifting from the no-trip position to the tripped position. The trip indication componentry is triggered by the linear lever sliding into the trip indication position. The trip indication componentry then provides an indication of a tripped state of the circuit breaker to an output. The output comprises an auxiliary port.

In some embodiments, the linear lever is coupled to a spring at a second end of the linear lever. The spring exerts a force on the linear lever that pushes the linear lever into the trip indication position in response to the tripping fork shifting from the no-trip position to the tripped position. The circuit breaker may further include a latch lever. The latch lever is triggered by a latch. The latch lever pushes the tripping fork from the no-trip position to the tripped position in response to the latch triggering the latch lever. The latch triggers the latch lever in response to a thermal overload in the circuit breaker. The circuit breaker may further include a rotary toggle. The rotary toggle has a pushing element on a circumferential edge of the rotary toggle. The pushing element pushes the linear lever from the trip indication position to the disengaged position in response to the rotary toggle rotating in a first direction. In pushing the linear lever to the disengaged position, the spring is compressed by the linear lever as it is pushed back. The circuit breaker may further include a faceplate. The faceplate has an opening through which an auxiliary port is accessible.

In some embodiments, the circuit breaker further includes a second tripping fork, a second linear lever, short indication componentry, and a second output. The second tripping fork shifts between a no-short position and a short position. The no-short position is in the first plane and the short position is in the second plane. The second tripping fork has a second contact surface that physically contacts a first end of the second linear lever in the no-short position and does not physically contact the first end of the second linear lever in the short position. The second linear lever is held in a second disengaged position by the second contact surface of the second tripping fork physically contacting a first end of the second linear lever when the second tripping fork is in the no-short position. The second linear lever slides in the third plane in the first direction into a short indication position in response to the second tripping fork shifting from the no-short position to the short position. The short indication componentry is triggered by the second linear lever sliding into the short indication position. The short indication componentry provides an indication of a magnetic trip to the second output of the circuit breaker. The second output comprises a second auxiliary port.

In some embodiments, the circuit breaker includes a latch lever triggered by a latch. The latch lever pushes the tripping fork from the no-trip position to the tripped position in response to the latch triggering the latch lever. The latch triggers the latch lever in response to a magnetic trip in the circuit breaker. In some embodiments, the linear lever slides in the third plane in the first direction into the trip indication position in response to the tripping fork shifting from the no-trip position to the tripped position. The second linear lever may further includes a second end of the second linear lever coupled to a second spring. The second spring exerts a force on the second linear lever that pushes the second linear lever into the short indication position in response to the second tripping fork shifting from the no-trip position to the tripped position.

In some embodiments, the circuit breaker further includes a rotary toggle. The rotary toggle has a pushing element on its circumferential edge. The pushing element pushes the linear lever from the trip indication position to the disengaged position in response to the rotary toggle rotating in a first direction. Pushing the linear lever to the disengaged position includes compressing the spring. The linear lever has a pushing element that pushes the second linear lever from the short indication position to the second disengaged position in response to the rotary toggle rotating in the first direction, which compresses the second spring. The circuit breaker may further include one or more magnetic plungers coupled to the second tripping fork. The second tripping fork shifts from the no-short position to the short position in response to the one or more magnetic plungers moving. The one or more magnetic plungers move in response to a magnetic field generated by a short circuit coil in response to a short circuit. In some embodiments, the faceplate has a second opening though which the second auxiliary port is accessible.

In another embodiment, a method of operating a circuit breaker includes holding, via a contact surface of a tripping fork that physically contacts a first end of a linear lever when the tripping fork is in a no-trip position, the linear lever in a disengaged position when the circuit breaker is closed. The method further includes, in response to a trip occurring in the circuit breaker, shifting the tripping fork from the no-trip position to a tripped position. The no-trip position is in a first plane, and shifting the tripping fork from the no-trip position to the tripped position includes shifting the tripping fork relative to the first plane and the contact surface of the tripping fork does not contact the first end of the linear lever when the tripping fork is in the tripped position. The method further includes, in response to shifting the tripping fork from the no-trip position to the tripped position, pushing, via a spring coupled to a second end of the linear lever, the linear lever in a second plane in a first direction into a trip indication position. The spring is compressed when the linear lever is in the disengaged position and the spring is extended when the linear lever is in the trip indication position. The method further includes, in response to the spring pushing the linear lever into the trip indication position, providing an indication of the trip to an output of the circuit breaker via trip indication componentry.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
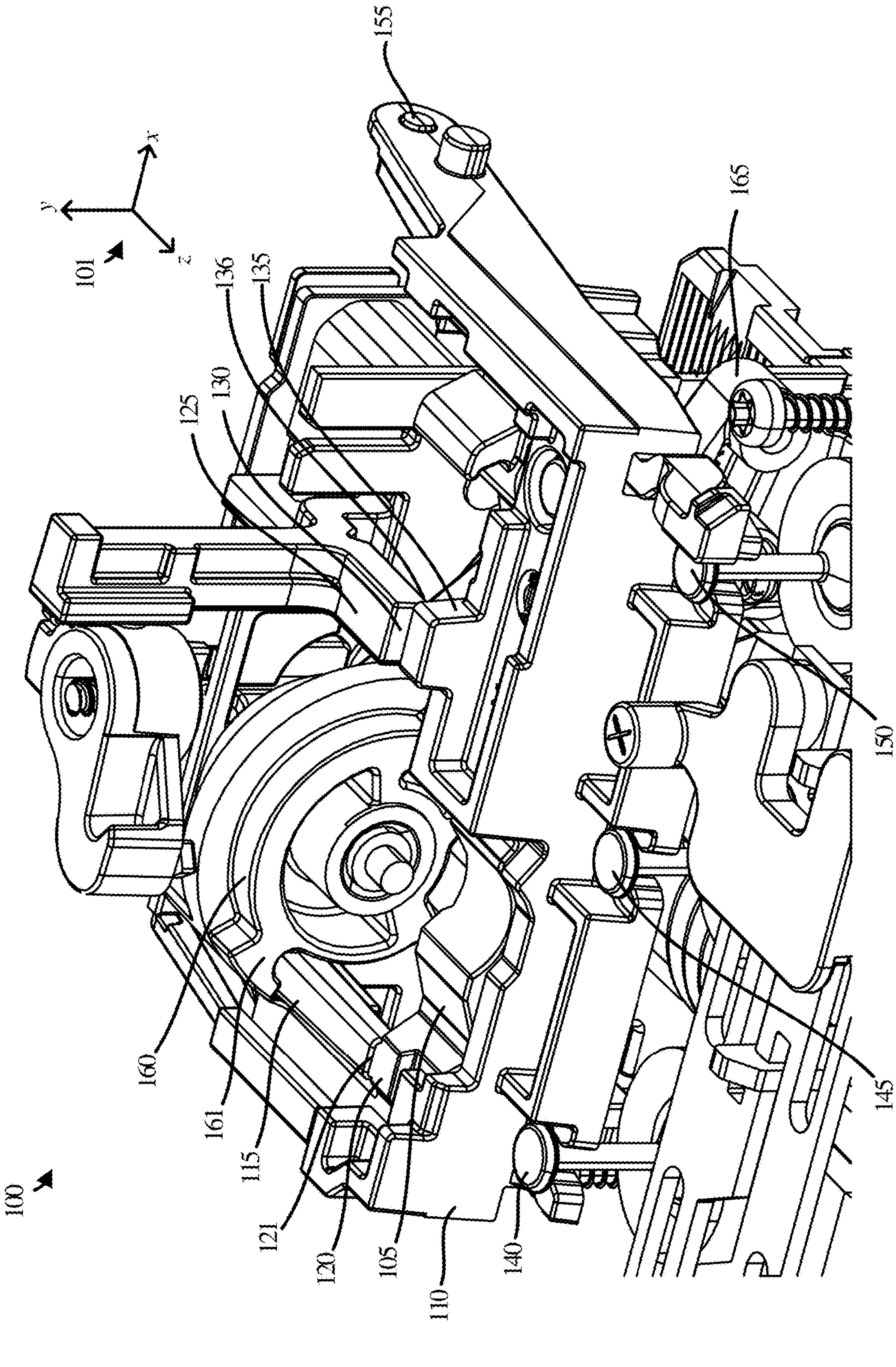
FIG. 1 illustrates an example of a thermal-magnetic circuit breaker, according to some embodiments.

Various embodiments of the present technology generally relate to circuit breaker mechanisms for providing information about trip events. More specifically, a linear lever and tripping fork mechanism is disclosed that provides information to front auxiliary ports on the circuit breaker about whether an overload or short circuit occurred in the device.

A circuit breaker is a switching device that interrupts current during fault conditions or overload circuits, thereby preventing damage caused by overcurrent. Many circuit breakers include both thermal protection and magnetic protection-often referred to as thermal-magnetic circuit breakers. In a thermal-magnetic circuit breaker, magnetic protection is provided by an electromagnet that interrupts current nearly instantaneously when the electromagnetic force generated by the large current is strong enough, protecting the circuit from the dangers and potential damage associated with large surges in current (i.e., short circuits). These surges in current are highly dangerous, both for nearby personnel and the system itself, and therefore must be interrupted quickly. Thermal protection, on the other hand, protects against lower value but longer-term overcurrent. Unlike magnetic protection, thermal protection does not cause the circuit breaker to trip immediately, but rather provides a time-response that is inversely proportional to the value of the overcurrent-tripping the circuit breaker quickly for larger currents but allowing smaller overloads to persist for longer periods. Thermal protection is achieved with a bimetallic strip that deforms as temperature changes, resulting in a mechanical displacement that trips the circuit breaker.

Thus, a thermal-magnetic circuit breaker is responsive to both small overloads that persist for too long and large spikes in current (i.e., short circuits). However, the inner componentry of circuit breakers is typically not exposed and therefore not visible to operators or other personnel who may wish to know what caused the device to trip (i.e., overload or short circuit). Information pertaining to what caused the circuit breaker to trip, however, may be useful to such operators or other personnel. Existing systems and methods that provide this information lack convenience, reliability, and flexibility.

The present technology, therefore, provides for a tripping fork and linear lever mechanism for circuit breakers that reliably provides information about whether a trip was caused by an over-current condition or a short circuit. In some embodiments, other tripping mechanisms including microprocessor or electronic mechanisms can be used to identify the over-current or short circuit events. In an embodiment of the technology, a three-phase circuit breaker includes two tripping forks and two linear levers. The first tripping fork is an over-current tripping fork that shifts from a no-trip position to a tripped position in response to an over-current condition in the circuit breaker. For the purposes of this specification, the over-current tripping fork is also referred to as a thermal tripping fork because in some embodiments, the over-current condition is identified with thermal tripping components. The thermal tripping fork, in the no-trip position (i.e., when the circuit breaker is closed) holds back a thermal linear lever in a disengaged position.

A first end of the thermal linear lever, when the thermal tripping fork is in the no-trip position, contacts the thermal tripping fork such that the thermal tripping fork prevents the thermal linear lever from sliding forward. The thermal linear lever is coupled to a spring on a second end of the thermal linear lever. The spring exerts a pushing force on the thermal linear lever towards the thermal tripping fork. Thus, the spring is in a compressed state when the thermal linear lever is being held in the disengaged position by the thermal tripping fork. However, when the thermal tripping fork shifts into the tripped position in response to the thermal trip occurring in the circuit breaker, it is no longer aligned with the thermal linear lever such that the thermal linear lever is released to slide into its trip indication position, pushed by the spring. When in the trip indication position, the thermal linear lever engages one or more additional components that transfer the indication to an auxiliary port on the front of the circuit breaker.

In some embodiments, the one or more additional components that transfer the indication to the auxiliary port include a spring lever. The spring lever, when engaged, holds an elbow spring away from an auxiliary contact when the thermal linear lever is in the disengaged position, and releases the elbow spring so that it comes into contact with the auxiliary contact when the thermal linear lever is in the trip indication position. The spring lever is pushed into its engaged position by an arm extending from the thermal linear lever. When the thermal linear lever shifts into its trip indication position, however, the arm shifts away from the spring lever, thereby releasing the elbow spring to come into contact with the auxiliary contact. The auxiliary port coupled to the auxiliary contact can therefore output an indication that a thermal trip occurred to one or more connected devices.

The second tripping fork is a short circuit tripping fork. For the purposes of this specification, the short circuit tripping fork is also referred to as a magnetic tripping fork because in some embodiments, the short circuit condition is identified with magnetic tripping components. The magnetic tripping fork shifts from a no-short position to a short circuit position in response to a magnetic trip occurring in the circuit breaker. The magnetic tripping fork, in the no-short position (i.e., when the circuit breaker is closed or after a thermal trip) holds back a magnetic linear lever in a disengaged position.

A first end of the magnetic linear lever, when the magnetic tripping fork is in the no-short position, contacts the magnetic tripping fork such that the magnetic tripping fork prevents the magnetic linear lever from sliding forward. The magnetic linear lever is coupled to a spring on a second end of the magnetic linear lever. The spring exerts a pushing force on the magnetic linear lever towards the magnetic tripping fork. Thus, the spring is in a compressed state when the magnetic linear lever is being held in the disengaged position by the magnetic tripping fork. However, when the magnetic tripping fork shifts into the short circuit position in response to a magnetic trip occurring in the circuit breaker, it is no longer aligned with the magnetic linear lever such that the magnetic linear lever is released to slide into its short indication position. When in the short indication position, the magnetic linear lever engages one or more additional components that transfer the indication to an auxiliary port on the front of the circuit breaker.

In some embodiments, the one or more additional components that transfer the indication to the auxiliary port include a spring lever. The spring lever, when engaged, holds an elbow spring away from an auxiliary contact when the magnetic linear lever is in the disengaged position, and releases the elbow spring so that it comes into contact with the auxiliary contact when the thermal linear lever is in the trip indication position. The spring lever is pushed into its engaged position by an arm extending from the magnetic linear lever. When the magnetic linear lever shifts into its short indication position, however, the arm shifts away from the spring lever, thereby releasing the elbow spring to come into contact with the auxiliary contact. The auxiliary port coupled to the auxiliary contact can therefore output an indication that a thermal trip occurred to one or more connected devices.

In certain embodiments, the thermal tripping fork and the magnetic tripping fork are coupled such that when the magnetic tripping fork shifts into its short circuit position, the thermal tripping fork also shifts into its tripped position. Thus, when a magnetic trip occurs in the circuit breaker, both linear levers slide forward into their respective indication positions and both auxiliary outputs output an indication signal, indicating a magnetic trip occurred.

Moving on to the Figures, FIG. 1 illustrates system 100 in a healthy state. System 100 is representative of a circuit breaker in which embodiments of the present technology are implemented. System 100 may include, for example, a thermal-magnetic circuit breaker. FIG. 1 shows only a portion of the components that make up system 100 in accordance with the present disclosure. System 100 includes additional componentry, including an external cover, omitted from FIG. 1 for the sake of clarity. As shown in FIG. 1, system 100 includes tripping fork 105, tripping fork 110, linear lever 115, tripping fork contact point 120, linear lever 125, linear lever contact surface 130, tripping fork contact point 135, magnetic plunger 140, magnetic plunger 145, magnetic plunger 150, pivot point 155, and latch lever 165. System 100 may include additional components as compared to what is shown in the example of FIG. 1 or may exclude components from what is shown in FIG. 1. FIG. 1 further includes axes 101, in reference to which elements of FIG. 1 are described.

Tripping fork 105 is a thermal tripping fork that pivots in response to a thermal trip occurring in system 100. Tripping fork 105 is shown in its no-trip position in FIG. 1. In its no-trip position, tripping fork 105 is in a first plane. However, when a thermal trip occurs in system 100, tripping fork 105 pivots into a second plane about an axis parallel to the x-axis that runs through pivot point 155 at the −z end of tripping fork 105. On the +z end of tripping fork 105, tripping fork 105 interacts with linear lever 115. Tripping fork 105 includes tripping fork contact point 120, where a surface on the +z side of linear lever 115 is contacting tripping fork 105 in FIG. 1. When a thermal trip occurs, the +z end of tripping fork 105 shifts (primarily in the −y direction), and tripping fork contact point 120 (in particular, contact surface 121 disposed on the −z side of tripping fork contact point 120) breaks contact with linear lever 115, allowing linear lever 115 to slide in the +y direction into its trip indication position. Linear lever 115 slides in a third x-z plane. As described, tripping fork 105 pivots out of the way of linear lever 115 in response to a thermal trip occurring in system 100. The pivoting, however, is directly caused by latch lever 165 that was triggered by a latch (e.g., latch 405). The latch is tripped by a compensation bimetal in the circuit breaker. Latch lever 165 moves in the −y direction in response to being tripped by the compensation bimetal, pushing the +z end of linear lever 115 in the −y direction along with it. In this way, tripping fork 105 is moved in response to the compensation bimetal tripping the circuit breaker due to an overload.

Linear lever 115 is a component that slides linearly in the +z direction, pushed by a spring, into its trip indication position when it is released by tripping fork 105. As previously described, when linear lever 115 is in the disengaged position (i.e., before a trip), it is in contact with tripping fork contact point 120 of tripping fork 105. In FIG. 1, linear lever 115 is in its disengaged position with tripping fork 105 preventing it from sliding into its trip indication position. Although not visible in FIG. 1, the −z end of linear lever 115 is coupled to a spring (see, e.g., FIG. 3, spring 315) that pushes linear lever 115 into its trip indication position when it is released by the pivoting away of tripping fork 105. The spring is therefore compressed when linear lever 115 is in its disengaged position, as it is in FIG. 1.

Additionally, on the −z end of linear lever 115 is a trip indication arm (see, e.g., FIG. 7, trip indication arm 705) that also slides linearly in the +z direction with linear lever 115. The trip indication arm may be an independent component or may be molded together with linear lever 115. Regardless of how it is coupled to linear lever 115, the trip indication arm translates the linear movement of linear lever 115 to other trip indication componentry to convey information about to the trip to the associated auxiliary port. The trip indication mechanisms are described in greater detail in reference to FIG. 7.

Tripping fork 110 is a magnetic tripping fork that pivots in response to magnetic trips (i.e., short circuits) occurring in system 100. Tripping fork 110 is shown in its no-short position in FIG. 1. In its no-short position, tripping fork 110 is in a first plane. However, when a magnetic trip occurs in system 100, tripping fork 110 pivots into its short position in a second plane by pivoting about an axis parallel to the x-axis that runs through pivot point 155 at the −z end of tripping fork 110. In some embodiments, tripping fork 110 pivots about the same axis as tripping fork 105. On the +z end of tripping fork 110, tripping fork 110 interacts with linear lever 125. Tripping fork 110 includes tripping fork contact point 135, including a surface (second contact surface 136) where tripping fork 110 is contacting linear lever contact surface 130 of linear lever 125 in FIG. 1. When a magnetic trip occurs, the +z end of tripping fork 110 shifts (primarily in the −y direction) and tripping fork contact point 135 breaks contact with linear lever 125, allowing linear lever 125 to slide in the +y direction into its trip indication position. Linear lever 125 also slides in the third x-z plane. As described, tripping fork 110 pivots out of the way of linear lever 125 in response to a magnetic trip occurring in system 100. The pivoting, however, is directly caused by one or more magnetic plungers that are tripped by the magnetic coil in the circuit breaker. The one or more magnetic plungers, in the example of FIG. 1, include magnetic plunger 140, magnetic plunger 145, and magnetic plunger 150, all of which are coupled to the +z end of tripping fork 110. When a short circuit occurs and the magnetic field produced by the magnetic coil of the circuit breaker gets very strong, the magnetic field pulls the plungers in towards the magnetic coil (i.e., in the −y direction), which in turn pull the +z end of tripping fork 110 with them in the −y direction. In this way, tripping fork 110 is moved when the magnetic coil trips the circuit breaker due to a short circuit.

Linear lever 125 is a component that slides linearly in the +z direction, pushed by a spring, into its short indication position when it is released by tripping fork 110. As previously described, when linear lever 125 is in the disengaged position (i.e., before a short), it is in contact with tripping fork contact point 135 of tripping fork 110. In FIG. 1, linear lever 125 is in its disengaged position with tripping fork 110 preventing it from sliding into its short indication position. Although not visible in FIG. 1, the −z end of linear lever 125 is coupled to a spring (see, e.g., FIG. 3, spring 320) that pushes linear lever 125 into its trip indication position when it is released by the pivoting away of tripping fork 110. The spring is therefore compressed when linear lever 125 is in its disengaged position, like in FIG. 1.

Additionally, on the −z end of linear lever 125 is a short indication arm (see, e.g., FIG. 7, short indication arm 730) that also slides linearly in the +z direction with linear lever 125. The short indication arm may be an independent component or may be molded together with linear lever 125. Regardless of how it is coupled to linear lever 125, the short indication arm translates the linear movement of linear lever 125 to other trip indication componentry to convey information about the short to the associated auxiliary port. The trip indication mechanisms are described in greater detail in reference to FIG. 7.

System 100 further includes toggle 160. Toggle 160 is a gearing component that may serve a multitude of functions, one of which is to assist in resetting the circuit breaker after a trip. Toggle 160 includes one or more pushing elements (e.g., pushing element 161) on a circumferential edge of the toggle. The pushing elements are configured to push linear lever 115 in the −z direction into its disengaged position as the circuit breaker is turned on after a trip. Toggle 160 is geared with one or more components of a rotary switch on the circuit breaker, such that when the switch is rotated from a “TRIP” position to an “ON” position, toggle 160 also rotates. As toggle 160 rotates, it pushes any linear levers in the −z direction that may have been pushed in the +z direction. For example, after a thermal trip, only linear lever 115 would have slid into its trip indication position. Thus, when toggle 160 rotates as the circuit breaker is turned on, one or more pushing elements of toggle 160 push linear lever 115 in the −z direction into its disengaged position, compressing the spring coupled to linear lever 115. Alternatively, after a short circuit, both linear lever 115 and linear lever 125 would have slid into the trip indication and the short indication position, respectively. In this case, when toggle 160 rotates as the circuit breaker is turned on, the one or more pushing elements of toggle 160 push linear lever 115 in the −z direction into its disengaged position, and a pushing component of linear lever 115 pushes linear lever 125 in the −z direction into its disengaged position as linear lever 115 slides back, thereby compressing the springs coupled to each of the linear levers. The mechanisms for resetting system 100 after a trip are described in greater detail in reference to FIG. 3.

The components discussed in reference to FIG. 1 may be comprised of any number of materials including but not limited to metal, plastic, ceramic, or similar materials or any combination thereof. However, in an exemplary embodiment of the present technology, any or all of tripping fork 105, tripping fork 110, linear lever 115, linear lever 125, and toggle 160 are comprised entirely or partially of plastic. Benefits that come from any or all of these parts comprising plastic include that they are inexpensive to manufacture, lightweight, and do not interfere with other electromagnetic forces in the circuit breaker.

Figure 2:
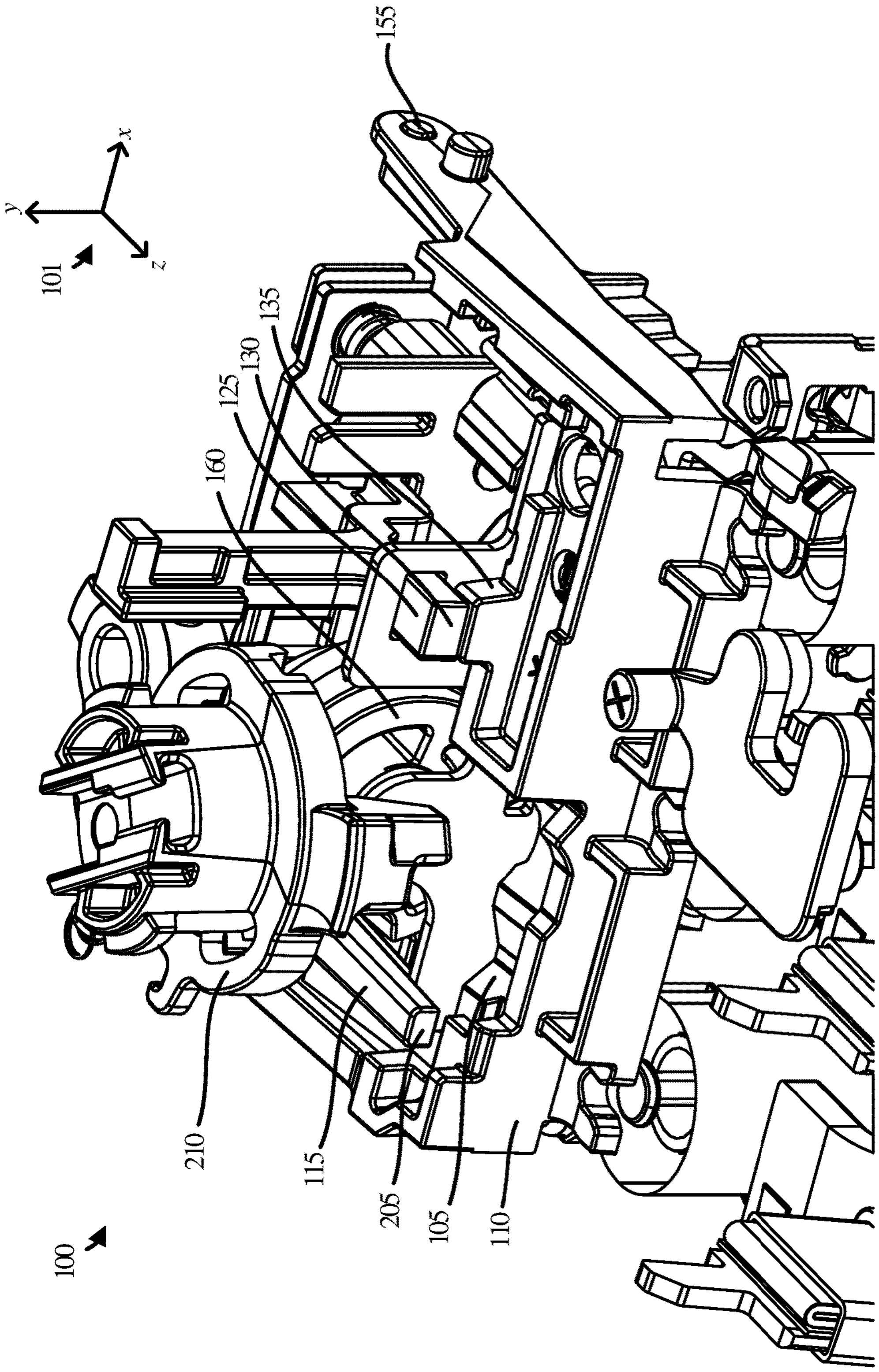
FIG. 2 illustrates an example of a thermal-magnetic circuit breaker in a tripped state, according to some embodiments.

FIG. 2 illustrates system 100 after a magnetic trip. System 100 is representative of a thermal-magnetic circuit breaker in which embodiments of the present technology are implemented. FIG. 2 shows only a portion of the components that make up system 100 in accordance with the present disclosure. System 100 includes additional componentry, including an external cover, omitted from FIG. 2 for the sake of clarity. As shown in FIG. 2, system 100 includes tripping fork 105, tripping fork 110, linear lever 115, linear lever 125, linear lever contact surface 130, tripping fork contact point 135, pivot point 155, toggle 160, linear lever contact surface 205, and rotary disk 210. System 100 may include additional components as compared to what is shown in the Example of FIG. 2 or may exclude components from what is shown in FIG. 2. FIG. 2 further includes axes 101, in reference to which elements of FIG. 2 are described.

In FIG. 2, system 100 is shown in a tripped state. More specifically, a magnetic trip has occurred in system 100 causing both tripping fork 105 and tripping fork 110 to pivot into their respective tripped positions and linear lever 115 and linear lever 125 to slide in the +z direction into their respective trip indication positions. As previously described, in some embodiments of system 100, both tripping forks pivot into their respective tripped positions and both linear levers slide into their respective indication positions in the case of a magnetic trip. In the case of a thermal trip, however, only a single tripping fork pivots into the tripped position and only a single linear lever slides into its trip indication position. However, this embodiment is only one example of how system 100 may operate. In other embodiments, only a single tripping fork may pivot into the tripped position and only a single linear lever may slide into its trip indication position in the case of a magnetic trip, while both tripping forks may pivot into the tripped position and both linear levers may slide into their trip indication positions in the case of a thermal trip. Alternatively, only a single tripping fork may pivot into the tripped position and only a single linear lever may slide into its trip indication position in both cases.

Thus, in FIG. 2, tripping fork 105 is in its tripped position and tripping fork 110 is in its short position. Linear lever 115 is therefore in its trip indication position as a result of being released by tripping fork 105 and linear lever 125 is also in its short indication position as a result of being released by tripping fork 110. Linear lever 115 includes linear lever contact surface 205, which was not visible in FIG. 1 because it was blocked by tripping fork contact point 120 due to tripping fork 105 being in the no-trip position.

In the present example, tripping fork 110 is coupled to tripping fork 105 such that tripping fork 105 is pulled by tripping fork 110 when tripping fork 110 is pulled by the magnetic plungers. Thus, when tripping fork 110 pivots about the axis that runs through pivot point 155, tripping fork 105 also pivots about the axis, causing both linear lever 115 and linear lever 125 to slide along the +z axis. Because both linear levers are in a trip indication position, the circuit breaker is outputting an indication from both of their respective auxiliary outputs that a trip occurred.

Figure 8A:
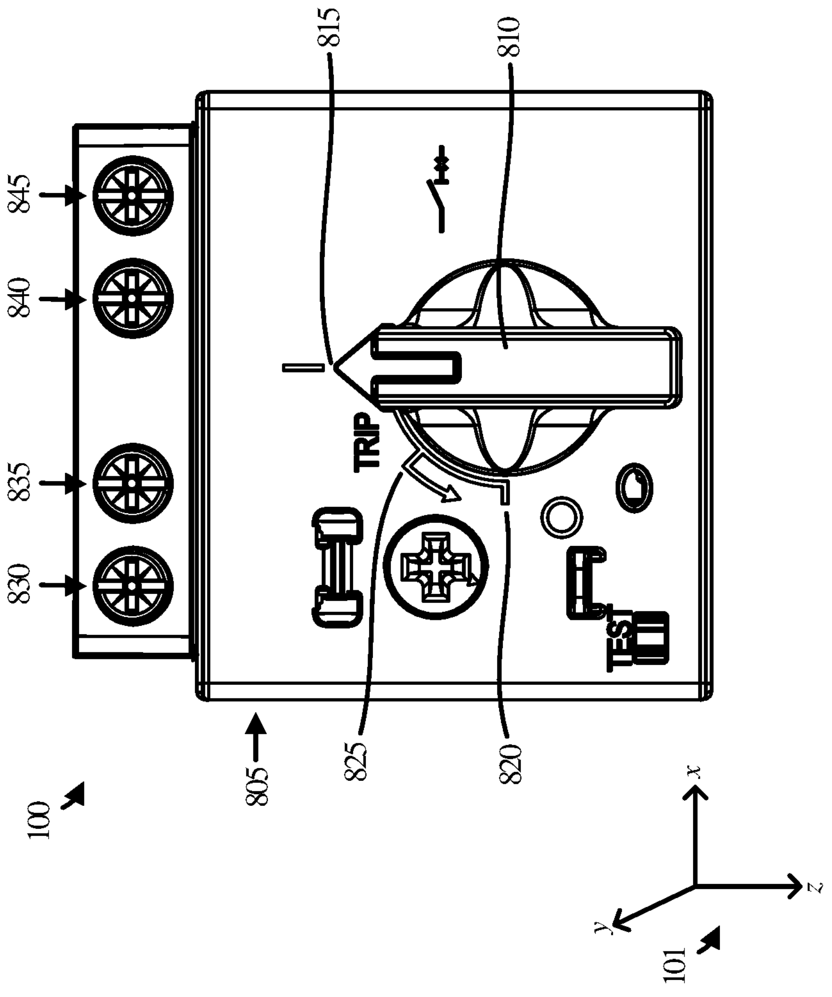
FIGS. 8A-8C illustrate three positions of a circuit breaker switch on a circuit breaker faceplate, according to some embodiments.
Figure 8B:
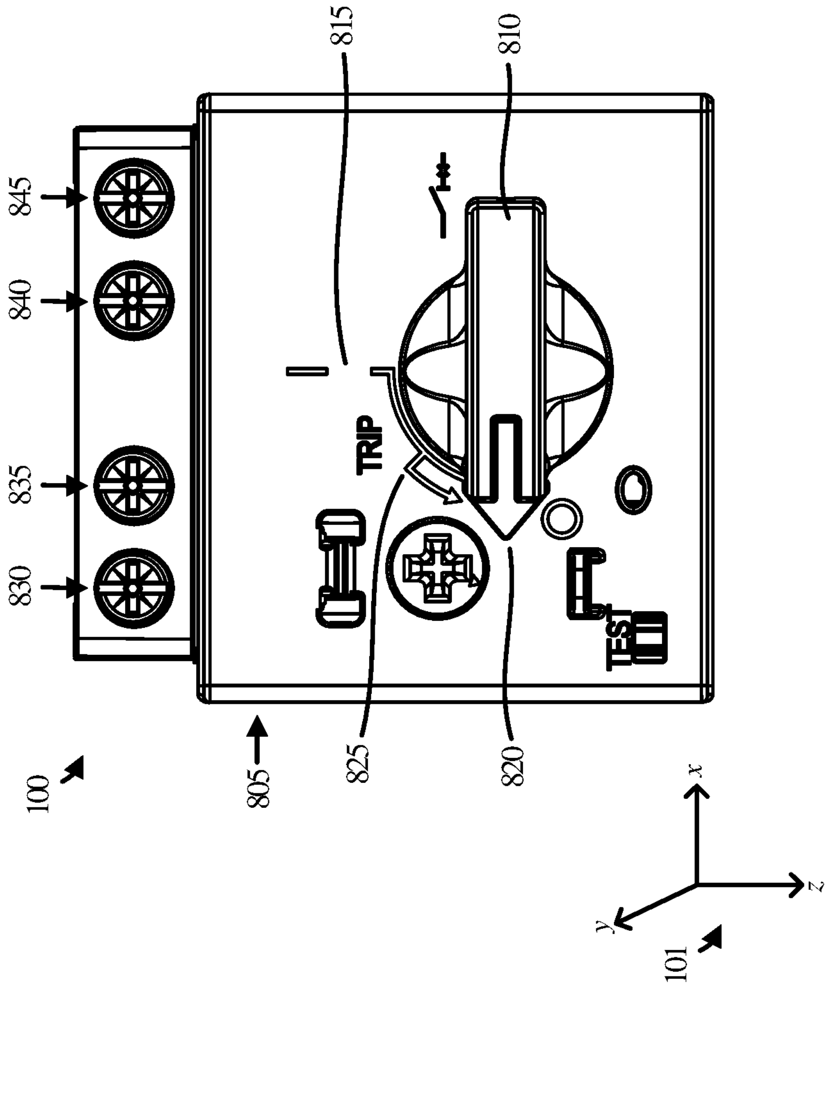
Figure 8C:
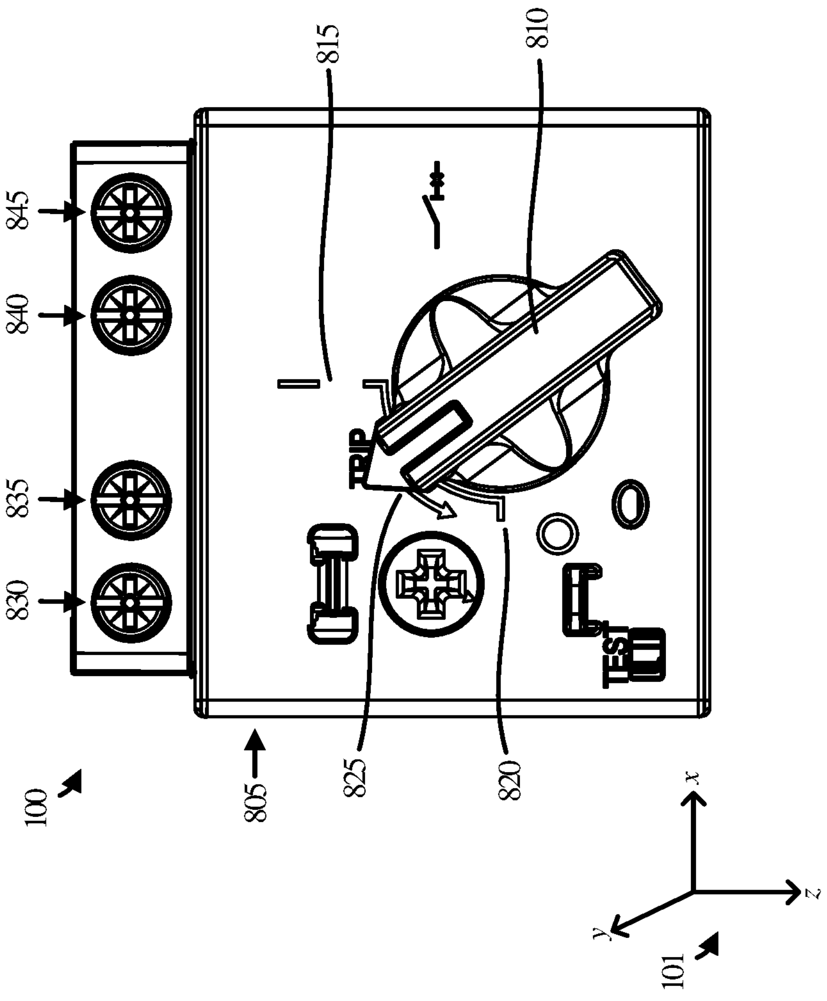

FIG. 2 also shows rotary disk 210, which is a component of the circuit breaker's switch, discussed in greater detail in reference to FIGS. 8A-8C. Rotary disk 210 rotates as the circuit breaker switch is turned by an operator or other user. Rotary disk 210 is coupled to toggle 160 such that toggle 160 rotates when rotary disk 210 turns. As previously described, when rotary disk 210 is turned from a "TRIP" position to an "ON" position, it rotates toggle 160 which resets the circuit breaker by pushing linear lever 115 into its disengaged position, which in turn pushes linear lever 125 in the −z direction as well if it has slid due to a magnetic trip.

Figure 3:
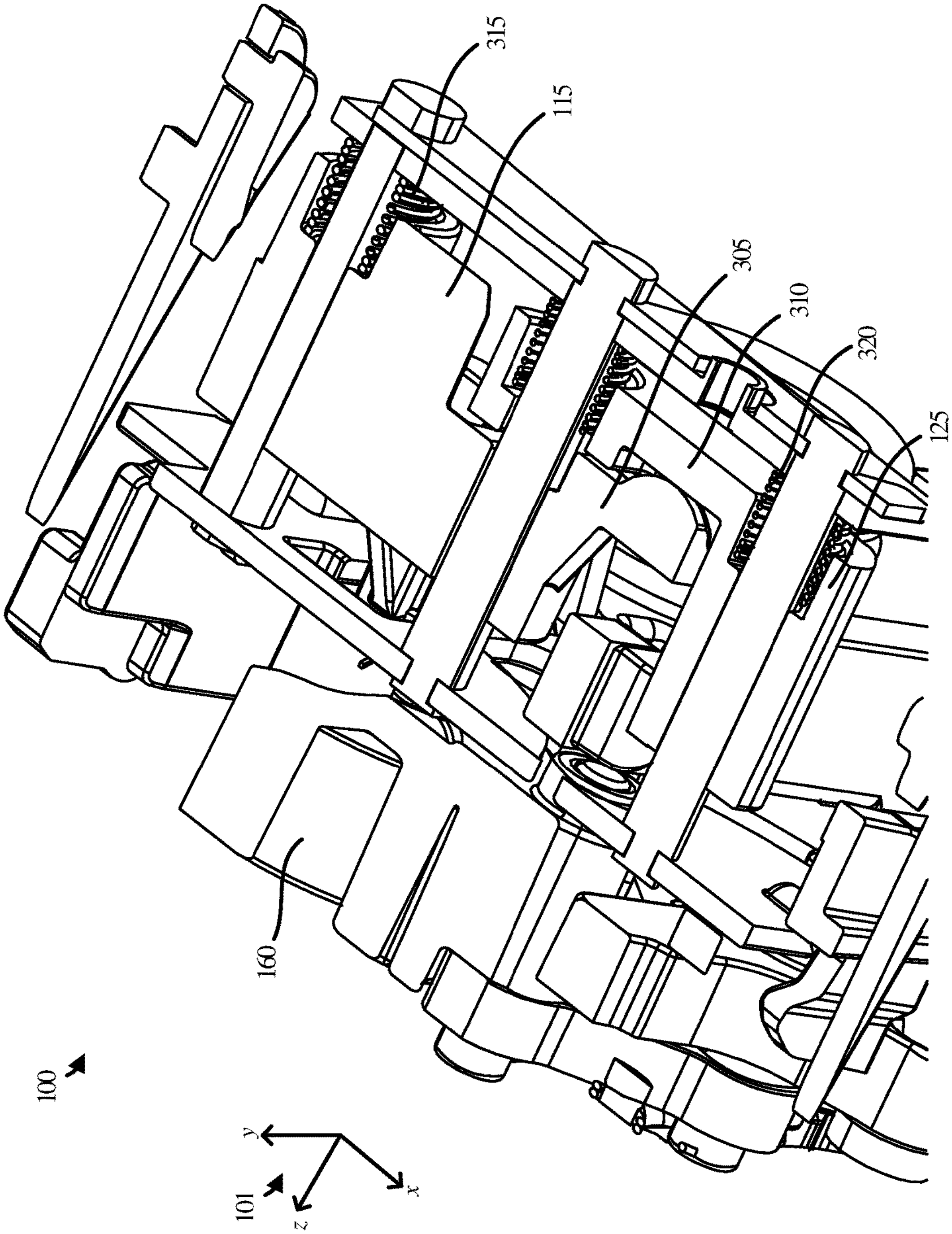
FIG. 3 illustrates a thermal-magnetic circuit breaker, according to some embodiments.

FIG. 3 illustrates system 100 while the circuit breaker of which system 100 is representative is turned on. FIG. 3 displays system 100 from the −z side, rather than from the +z like in FIG. 1 and FIG. 2. FIG. 3 shows only a portion of the components that make up system 100 in accordance with the present disclosure. System 100 includes additional componentry, including an external cover, omitted from FIG. 3 for the sake of clarity. As shown in FIG. 3, system 100 includes linear lever 115, linear lever 125, toggle 160, linear lever pushing element 305, linear lever catching element 310, spring 315, and spring 320. System 100 may include additional components as compared to what is shown in the example of FIG. 3 or may exclude components from what is shown in FIG. 3. FIG. 3 further includes axes 101, in reference to which elements of FIG. 3 are described.

As shown in FIG. 3, linear lever 115 is coupled to linear lever pushing element 305. In some embodiments, linear lever pushing element 305 is molded to or an integrated part of linear lever 115. In other embodiments, linear lever pushing element 305 may be an independent component from linear lever 115 but nonetheless coupled to linear lever 115 such that they move together. Linear lever 125 is coupled to linear lever catching element 310. In some embodiments, linear lever catching element 310 is molded to or an integrated part of linear lever 125. In other embodiments, linear lever catching element 310 may be an independent component from linear lever 125 but nonetheless coupled to linear lever 125 such that they move together.

Each of linear lever pushing element 305 and linear lever catching element 310 play a role in resetting the circuit breaker after a trip. More specifically, linear lever pushing element 305 is coupled to linear lever 115 such that when linear lever 115 gets pushed (i.e., shifts in the −z direction when pushed by toggle 160) into its disengaged position, linear lever pushing element 305 also moves back. Linear lever pushing element 305, however, overlaps with linear lever catching element 310 such that, in the case of a magnetic trip where linear lever 125 has also slid in the +z direction, linear lever pushing element 305 pushes into linear lever catching element 310 of linear lever 125 when linear lever 115 slides back. This results in both linear levers being reset into their disengaged positions when the device is reset (i.e., turned to "ON") after a magnetic trip. When a thermal trip occurs, linear lever 125 stays in its disengaged position and therefore is not pushed by linear lever pushing element 305 when the device is reset.

Linear lever 115 is also coupled to spring 315. Linear lever 125 is coupled to spring 320. Spring 315 and spring 320 are each in a compressed state in FIG. 3 because system 100 is turned on and a trip has not yet occurred. Thus, linear lever 115 is in its disengaged position and linear lever 125 is in its disengaged position, meaning that both springs are compressed. When a trip occurs and linear lever 115 is no longer held in its disengaged position by tripping fork 105, linear lever 115 is pushed in the +z direction by spring 315. Thus, when linear lever 115 is in its trip indication position, spring 315 is in an extended state. When a magnetic trip occurs and neither linear lever 115 nor linear lever 125 are held in their disengaged position by tripping fork 105 and tripping fork 110, linear lever 115 is pushed in the +z direction by spring 215 and linear lever 125 is pushed in the +z direction by spring 320. Thus, after a magnetic trip occurs, both spring 315 and spring 320 are in an extended state, in some embodiments.

Each of spring 315 and spring 320 may be representative of one or more springs in accordance with embodiments of the present technology. Thus, in some embodiments, linear lever 115 is pushed by a plurality of springs in the same manner that spring 315 is described as pushing linear lever 115 and linear lever 125 is pushed by a plurality of springs in the same manner that spring 320 is described as pushing linear lever 125.

Figure 4A:
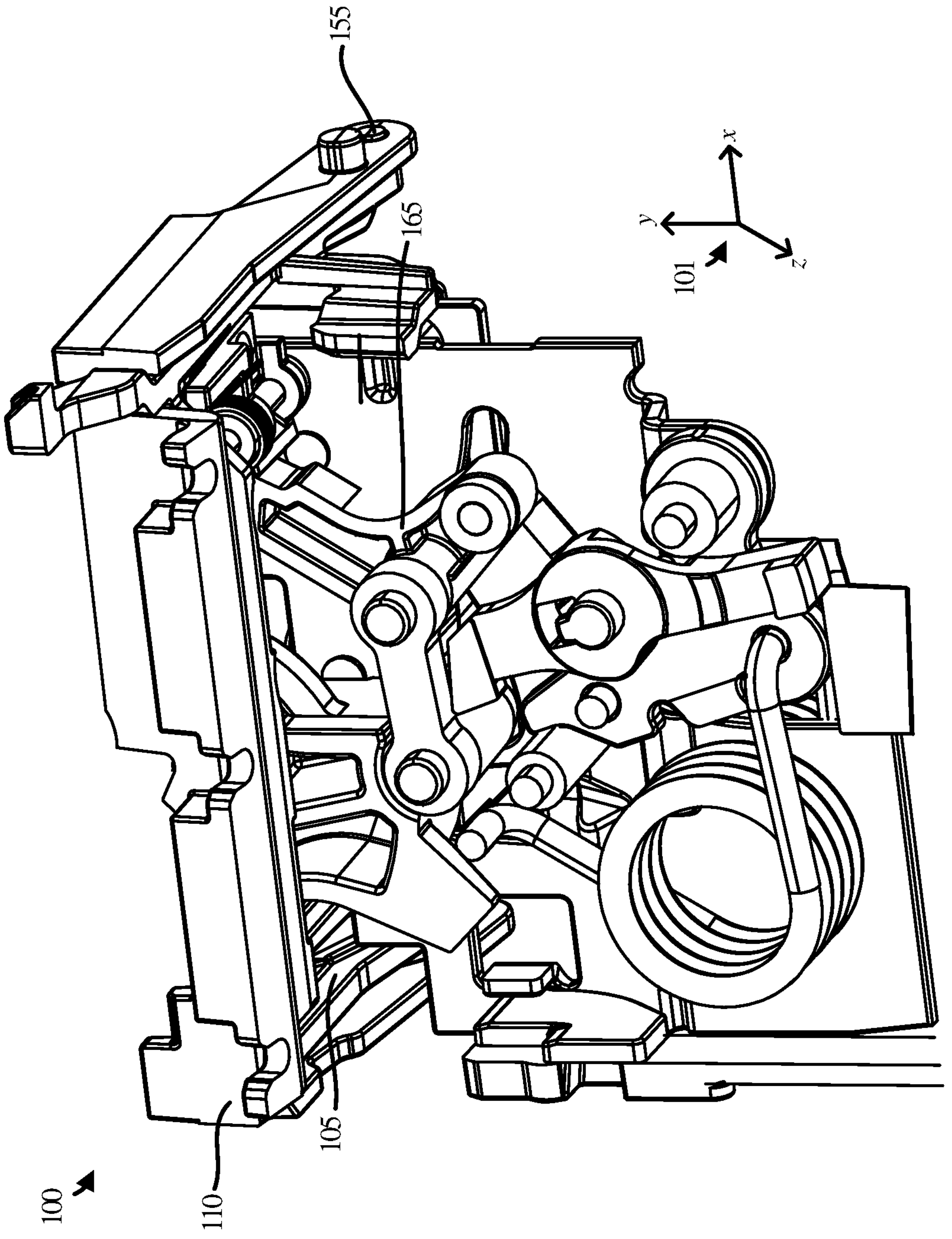
FIGS. 4A and 4B illustrate a circuit breaker latch lever, according to some embodiments.
Figure 4B:
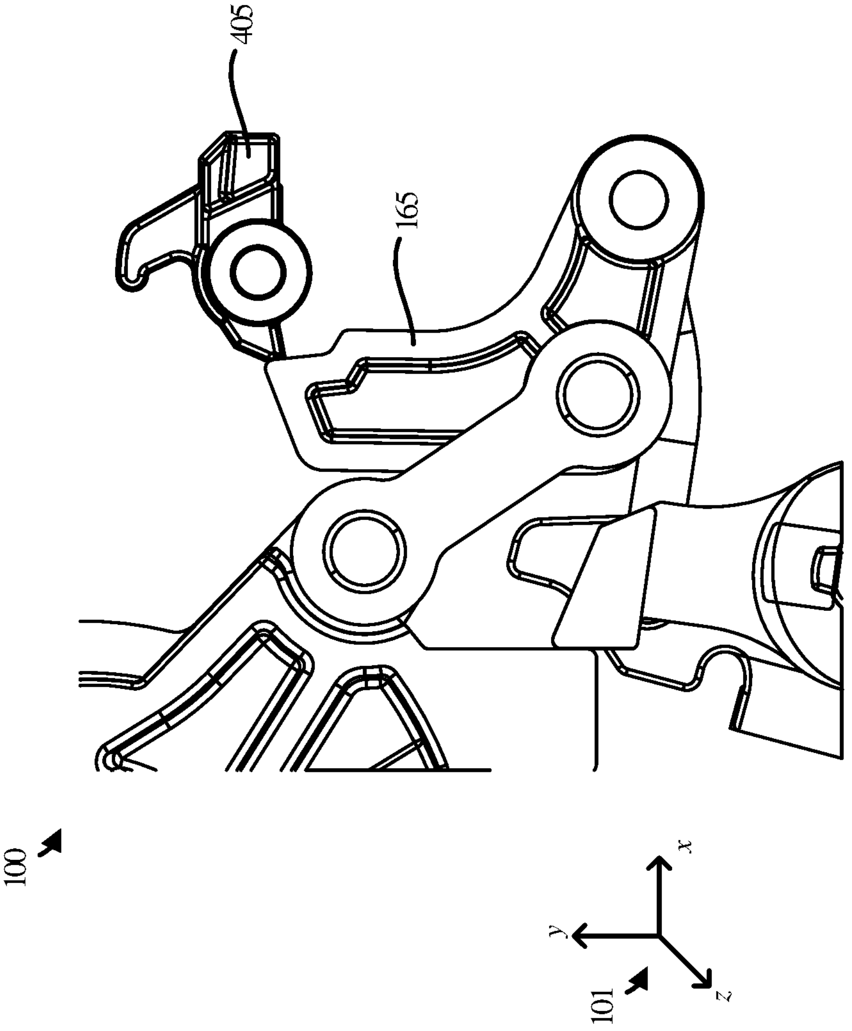

FIGS. 4A and 4B illustrate a latch and latch lever mechanism that play a role in tripping the thermal linear lever in response to a thermal trip occurring the circuit breaker. FIG. 4A illustrates the latch lever and tripping fork mechanism of system 100 in accordance with some embodiments of the present technology. System 100 includes additional componentry, including an external cover, omitted from FIG. 4A for the sake of clarity. As shown in FIG. 4A, system 100 includes tripping fork 105, tripping fork 110, pivot point 155, and latch lever 165. System 100 may include additional components as compared to what is shown in the example of FIG. 4A or may exclude components shown in FIG. 4A. FIG. 4A further includes axes 101, in reference to which elements of FIG. 4A are described.

System 100, in FIG. 4A, is not in a healthy state. In other words, system 100 is either on or off, but not tripped. In the event of a trip, however, latch lever 165 is triggered by a latch (e.g., latch 405, FIG. 4B). To trigger latch lever 165, the latch releases latch lever 165 from its position shown in FIG. 4A such that latch lever 165 rotates clockwise (in reference to FIG. 4A) into its tripped position. When latch lever 165 rotates into its tripped position, it pushes tripping fork 105 into its tripped position. Thus, a first end on the +y end of latch lever 165 physically contacts tripping fork 105 when in the no-trip position. Latch lever 165 rotates into its tripped position in response to both a thermal trip and a magnetic trip occurring in the circuit breaker. Thus, as previously described, tripping fork 105 shifts into its tripped position in both cases as well, pivoting about pivot point 155.

FIG. 4B illustrates the latch lever and latch mechanism of system 100 in accordance with some embodiments of the present technology. System 100 includes additional componentry, including an external cover, omitted from FIG. 4B for the sake of clarity. As shown in FIG. 4B, system 100 includes latch lever 165 and latch 405. System 100 may include additional components as compared to what is shown in the example of FIG. 4B or may exclude components shown in FIG. 4B. FIG. 4B further includes axes 101, in reference to which elements of FIG. 4B are described.

When the circuit breaker is not tripped (i.e., it is in the on position or in the off position, but not tripped), a contact surface of latch lever 165 applies a normal force against a contact surface of latch 405. A frictional force between the two contact surfaces results from the normal force between them, which resists rotation of latch 405 from its no-trip position to its tripped position. A specified tripping force is thus required to overcome the frictional forces and trip the device. Thus, when the requisite tripping force is met, a trip is initiated by rotation of latch 405, which breaks the contact between latch lever 165 and latch 405. Latch lever 165 is then freed to rotate due to another force exerted by a buckled shackle. Latch lever 165 pushes tripping fork 105 with it as it rotates until tripping fork 105 reaches its tripped position, at which point latch lever 165 may continue to rotate after breaking contact with tripping fork 105.

The means of pivoting tripping fork 105 described in reference to FIGS. 4A and 4B are described solely for purposes of example. Other systems or methods may be used to pivot tripping fork 105 in response to a trip in the circuit breaker and still be anticipated by the technology disclosed herein.

Figure 5:
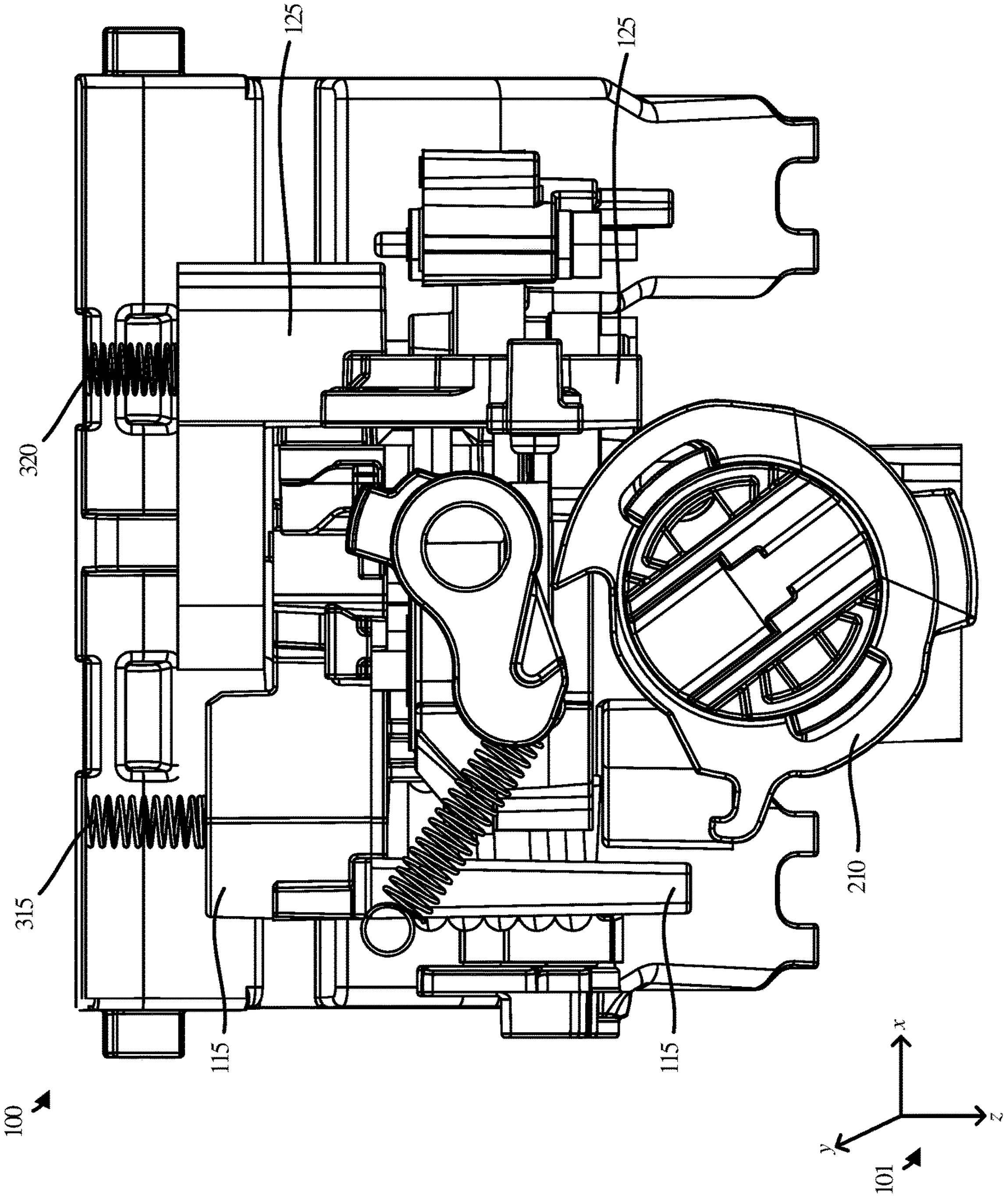
FIG. 5 illustrates a thermal-magnetic circuit breaker in a tripped state, according to some embodiments.

FIG. 5 illustrates a top view of the linear lever and tripping fork mechanism of system 100 in accordance with some embodiments of the present technology. System 100 includes additional componentry, including an external cover, omitted from FIG. 5 for the sake of clarity. As shown in FIG. 5, system 100 includes linear lever 115, linear lever 125, rotary disk 210, spring 315, and spring 320. System 100 may include additional components as compared to what is shown in the example of FIG. 5 or may exclude components from what is shown in FIG. 5. FIG. 5 further includes axes 101, in reference to which elements of FIG. 5 are described.

System 100, in the example of FIG. 5, is tripped in response to an overload (i.e., a thermal trip). Thus, linear lever 115 is in its trip indication position, which it slid into in the +z direction in response to tripping fork 105 (not shown in FIG. 5) pivoting into its tripped position. Linear lever 115 was pushed into its trip indication position by spring 315, which is shown in an extended state in FIG. 5. On the contrary, linear lever 125 remains in its disengaged position and spring 320 is therefore shown in a compressed state in FIG. 5.

FIG. 5 also shows rotary disk 210. As previously described, rotary disk 210 is directly coupled to a switch on the circuit breaker that can be turned to turn the device on and off (see, e.g., switch 810). Rotary disk 210 is in the "TRIP" position because of the thermal trip shown in FIG. 5. The "TRIP" position is an intermediary position between "ON" and "OFF" that rotary disk 210 and the associated switch turn to after a trip, indicating to operators or other personnel that a trip occurred, and the circuit is therefore open. The operator or other personnel may then turn the circuit breaker all the way to "OFF" by turning the switch counterclockwise (in reference to FIG. 5) or back to "ON" by turning the switch clockwise (in reference to FIG. 5), resetting the circuit breaker. The various positions of rotary disk 210 and the associated switch are discussed in greater detail in reference to FIGS. 8A-8C.

Figure 6:
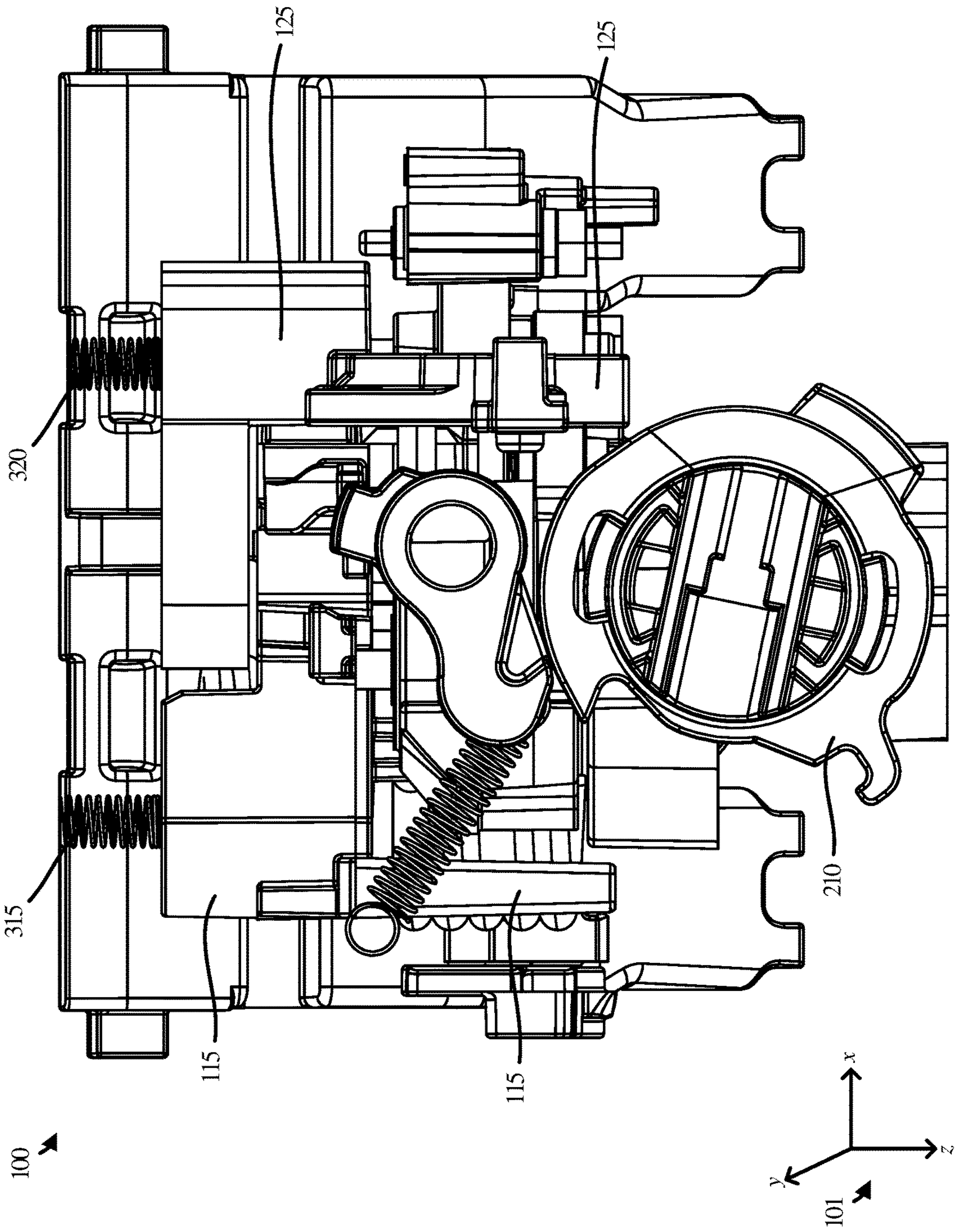
FIG. 6 illustrates a thermal-magnetic circuit breaker, according to some embodiments.

FIG. 6 illustrates another top view of the linear lever and tripping fork mechanism of system 100 in accordance with some embodiments of the present technology. System 100 includes additional componentry, including an external cover, omitted from FIG. 6 for the sake of clarity. As shown in FIG. 6, system 100 includes linear lever 115, linear lever

125, rotary disk 210, spring 315, and spring 320. System 100 may include additional components as compared to what is shown in the example of FIG. 6 or may exclude components from what is shown in FIG. 6. FIG. 6 further includes axes 101, in reference to which elements of FIG. 6 are described.

System 100, in the example of FIG. 6, is turned off but is not tripped. Thus, linear lever 115 and linear lever 125 are both in their disengaged positions. Spring 315 and spring 320 are therefore both in a compressed state as well. Rotary disk 210 is rotated counterclockwise (in reference to FIG. 6) compared to its position in FIG. 5. Rotary disk 210, in FIG. 6, is in the "OFF" position, meaning that the circuit is open, and no current is flowing through the circuit breaker. The various positions of rotary disk 210 and the associated switch are discussed in greater detail in reference to FIGS. 8A-8C.

Figure 7:
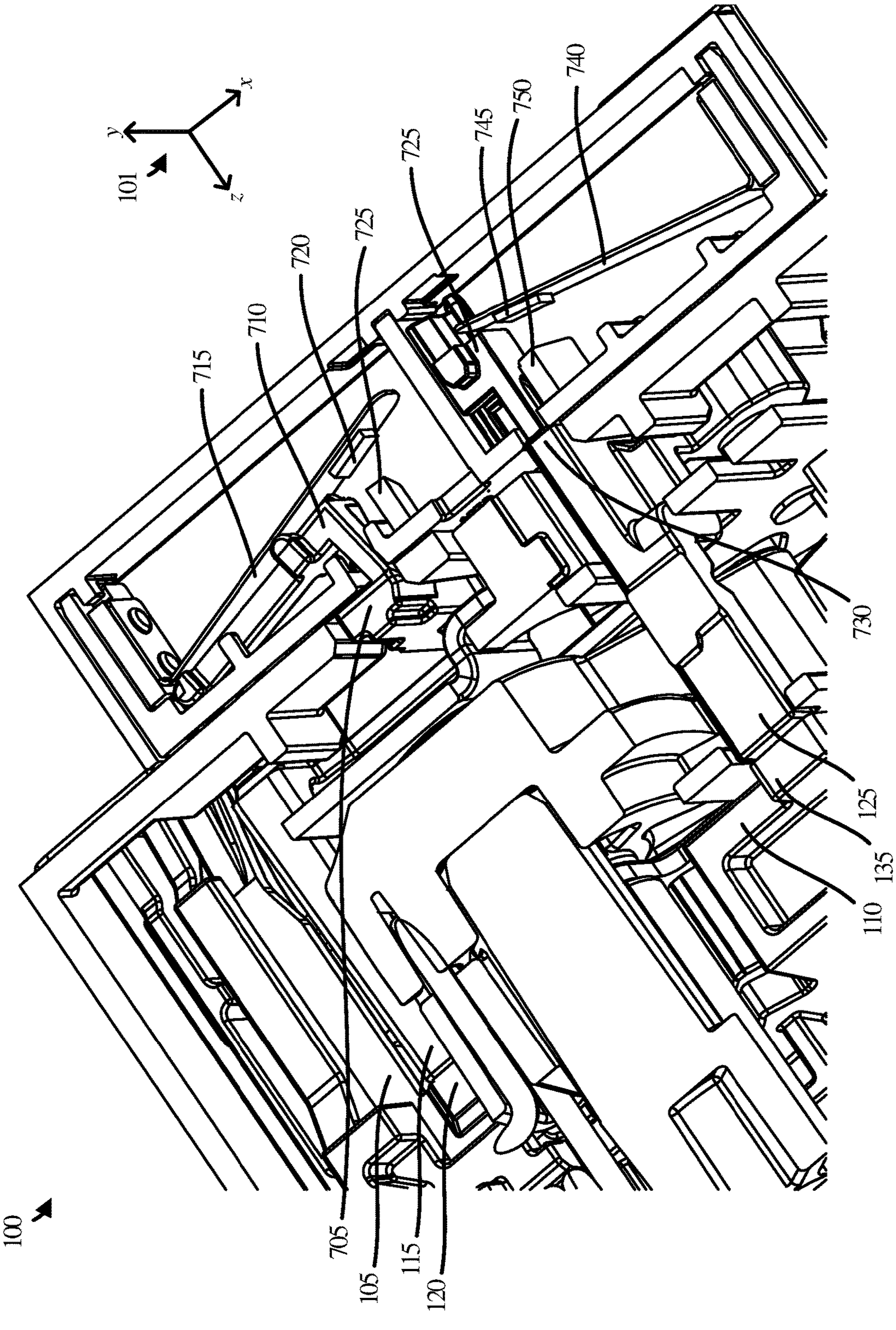
FIG. 7 illustrates trip indication componentry of a thermal-magnetic circuit breaker, according to some embodiments.

FIG. 7 illustrates system 100 while the circuit breaker of which system 100 is representative is turned on. FIG. 7 displays trip indication componentry of system 100, not visible in the preceding Figures. FIG. 7 shows only a portion of the components that make up system 100 in accordance with the present disclosure. System 100 includes additional componentry, including an external cover, omitted from FIG. 7 for the sake of clarity. As shown in FIG. 7, system 100 includes tripping fork 105, tripping fork 110, linear lever 115, tripping fork contact point 120, linear lever 125, tripping fork contact point 135, trip indication arm 705, spring lever 710, elbow spring 715, contact 720, contact 725, short indication arm 730, spring lever 735, elbow spring 740, contact 745, and contact 750. System 100 may include additional components as compared to what is shown in the example of FIG. 7 or may exclude components from what is shown in FIG. 7. FIG. 7 further includes axes 101, in reference to which elements of FIG. 3 are described.

The trip indication componentry (components 705-750) shown in FIG. 7 provides the indication of the trip to an output on the circuit breaker. As mentioned, FIG. 7 shows system 100 in an "ON" position—that is, the circuit is closed and current is flowing through the device; the circuit breaker is not tripped. Thus, the circuit breaker in FIG. 7 does not provide any indication of a trip to the device's outputs. Therefore, linear lever 115 and linear lever 125 are both in their disengaged positions, held in place by tripping fork 105 and tripping fork 110, respectively.

Linear lever 115 is coupled to trip indication arm 705. Trip indication arm 705 may be molded together with linear lever 115 such that they make up the same component, or trip indication arm 705 may be an independent component coupled to linear lever 115 in another fashion. Regardless of how trip indication arm 705 is coupled to linear lever 115, trip indication arm 705 moves with linear lever 115 when the circuit breaker trips and is reset. Thus, trip indication arm 705 also slides linearly in the +y direction when a trip occurs and in the −y direction when the circuit breaker is reset.

In the disengaged position of linear lever 115, trip indication arm 705 is preventing a trip indication from being sent by the circuit breaker. Trip indication arm 705, because it is shifted in the −z direction, is in its engaged position, holding elbow spring 715 away from contact 725 via spring lever 710. Elbow spring 715 is an L-shaped spring that bends at its elbow in response to force being applied to a leg of the L-shaped spring. Because elbow spring 715 is being held away from contact 725 by spring lever 710, contact 720, which is coupled to elbow spring 715, is not touching contact 725, and no trip indication is being sent. Spring lever 710 is an L-shaped component that pivots in an x-z plane about a pivot point on the +x end of spring lever 710. Spring lever 710 pivots counterclockwise (in the x-z plane as shown in FIG. 7) to push elbow spring 715 away from contact 725.

However, when a trip (thermal or magnetic) occurs in the circuit breaker, linear lever 115 slides in the +z direction into its trip indication position. Trip indication arm 705, as a result of being coupled to linear lever 115, also slides in the +z direction, away from spring lever 710. Spring lever 710 is therefore released, causing it to pivot clockwise into its disengaged position, pushed by elbow spring 715, until contact 720 comes into contact with contact 725. When contact 720 comes into contact with contact 725, trip indication is provided via one of the device's outputs (i.e., an auxiliary port on an external faceplate of the circuit breaker) to one or more connected devices. When the device is reset, linear lever 115 is pushed in the −z direction into its disengaged position by toggle 160 and trip indication arm 705 pushes spring lever 710 into its engaged position, thereby separating contact 720 and contact 725.

Linear lever 125 is coupled to short indication arm 730. Short indication arm 730 may be molded together with linear lever 125 such that they make up the same component, or short indication arm 730 may be an independent component coupled to linear lever 125 in another fashion. Regardless of how short indication arm 730 is coupled to linear lever 125, short indication arm 730 moves with linear lever 125 when the circuit breaker experiences a magnetic trip and is reset. Thus, short indication arm 730 also slides linearly in the +y direction when a magnetic trip occurs and in the −y direction when the circuit breaker is reset after the magnetic trip.

In the disengaged position of linear lever 125, short indication arm 730 is preventing a short circuit indication from being sent by the circuit breaker. Short indication arm 730, because it is shifted in the −z direction, is in its engaged position, holding elbow spring 740 away from contact 750 via spring lever 735. Elbow spring 740 is an L-shaped spring that bends at its elbow in response to force being applied to a leg of the L-shaped spring. Because elbow spring 740 is being held away from contact 750 by spring lever 735, contact 745, which is coupled to elbow spring 740, is not touching contact 750, and no short circuit indication is being sent. Spring lever 735, in the present example, is a component that shifts linearly along the z-axis in an x-z plane. Spring lever 735 shifts in the −z direction to push elbow spring 740 away from contact 750.

However, when a magnetic trip occurs in the circuit breaker, linear lever 125 slides in the +z direction into its short indication position. Short indication arm 730, as a result of being coupled to linear lever 125, also slides in the +z direction, away from spring lever 735. Spring lever 735 is therefore released, causing it to shift in the +z direction into its disengaged position, pushed by elbow spring 740, until contact 745 comes into contact with contact 750. When contact 745 comes into contact with contact 750, the trip indication is provided via one of the device's outputs (i.e., an auxiliary port on an external faceplate of the device) to one or more connected devices. When the circuit breaker is reset, linear lever 125 is pushed into its disengaged position and short indication arm 730 pushes spring lever 735 into its engaged position, thereby separating contact 745 and contact 750.

The components discussed in reference to FIG. 7 may be comprised of any number of materials including but not limited to metal, plastic, ceramic, or similar materials or any combination thereof. However, in an exemplary embodiment of the present technology, any or all of trip indication arm 705, spring lever 710, short indication arm 730, and spring lever 735 are comprised entirely or partially of plastic. Benefits that come from any or all of these parts comprising plastic include that they are inexpensive to manufacture, lightweight, and do not interfere with other electromagnetic forces in the circuit breaker. Other components, however, such as elbow spring 715, contact 720, contact 725, elbow spring 740, contact 745, and contact 750 are, in an exemplary embodiment, comprised of metal. These components may be comprised of one or more metallic substances that may include alloys. The components may vary in what specific metals make up each of them.

FIG. 8A illustrates switching faceplate 805 of system 100 in accordance with some embodiments of the present technology. Switching faceplate 805 includes switch 810, "ON" position 815, "OFF" position 820, "TRIP" position 825, auxiliary port 830, auxiliary port 835, auxiliary port 840, and auxiliary port 845. System 100 may include fewer or additional components as compared to what is shown in the example of FIG. 8A. FIG. 8A further includes axes 101, in reference to which elements of FIG. 8A are described.

In the example of FIG. 8A, switch 810 is rotated to "ON" position 815. As previously described, when switch 810 is turned to "ON" position 815, rotary disk 210 is also rotated to its corresponding "ON" position, as a result of being directly coupled to switch 810 or molded to switch 810 in some embodiments. When in the "ON" position, the circuit breaker is closed and current is flowing through the device.

When switch 810 is in "ON" position 815, the circuit breaker is not tripped via a thermal or magnetic trip. Thus, although not visible in FIG. 8A, tripping fork 105 is in its no-trip position, tripping fork 110 is in its no-short position, linear lever 115 is in its disengaged position, and linear lever 125 is in its disengaged position. Thus, in some embodiments, the state of switching faceplate 805 as shown in FIG. 8A corresponds to the state of system 100 in FIG. 1, FIG. 3, and FIG. 7.

FIG. 8B illustrates switching faceplate 805 of system 100 in accordance with some embodiments of the present technology. Switching faceplate 805 includes switch 810, "ON" position 815, "OFF" position 820, "TRIP" position 825, auxiliary port 830, auxiliary port 835, auxiliary port 840, and auxiliary port 845. System 100 may include fewer or additional components as compared to what is shown in the example of FIG. 8B. FIG. 8B further includes axes 101, in reference to which elements of FIG. 8B are described.

In the example of FIG. 8B, switch 810 is rotated to "OFF" position 820. As previously described, when switch 810 is turned to "OFF" position 820, rotary disk 210 is also rotated to its corresponding "OFF" position, as a result of being directly coupled to switch 810 or molded to switch 810 in some embodiments. When in the "OFF" position, the circuit breaker is open and current is not flowing through the device.

When switch 810 is in "OFF" position 820, the circuit breaker may have tripped or may not have tripped. In some scenarios, the circuit breaker may be turned from "ON" position 815 to "OFF" position 820 without a trip occurring in the device first. In other scenarios, the circuit breaker may trip, causing switch 810 to automatically rotate from "ON" position 815 to "TRIP" position 825. A user may then turn the circuit breaker from "TRIP" position 825 directly into "OFF" position 820, without first turning the device back on to reset it. Thus, although not visible in FIG. 8B, tripping fork 105 may be in its no-trip position or tripped position, tripping fork 110 may be in its no-short position or short position, linear lever 115 may be in its disengaged position or trip indication position, and linear lever 125 may be in its disengaged position or short indication position. Thus, in some embodiments, the state of switching faceplate 805 as shown in FIG. 8B corresponds to the state of system 100 in FIG. 1 or FIG. 6.

FIG. 8C illustrates switching faceplate 805 of system 100 in accordance with some embodiments of the present technology. Switching faceplate 805 includes switch 810, "ON" position 815, "OFF" position 820, "TRIP" position 825, auxiliary port 830, auxiliary port 835, auxiliary port 840, and auxiliary port 845. System 100 may include fewer or additional components as compared to what is shown in the example of FIG. 8C. FIG. 8C further includes axes 101, in reference to which elements of FIG. 8C are described.

In the example of FIG. 8C, switch 810 is rotated to "TRIP" position 825. When a trip, thermal or magnetic occurs, switch 810 automatically rotates to "TRIP" position 825, thereby indicating to operators or other personnel that a trip occurred. As previously described, when switch 810 is turned to "TRIP" position 825, rotary disk 210 is also rotated to is corresponding "TRIP" position, as a result of being directly coupled to switch 810 or molded to switch 810 in some embodiments. When in the "TRIP" position, the circuit breaker is tripped and current is not flowing through the device. Thus, in some embodiments, the state of switching faceplate 805 as shown in FIG. 8C corresponds to the state of system 100 in FIG. 2 and FIG. 5.

When switch 810 is in "TRIP" position 825, the circuit breaker has been tripped by a thermal or magnetic trip. Thus, although not visible in FIG. 8C, tripping fork 105 is in its tripped position and linear lever 115 is in its trip indication position. If the trip was a magnetic trip, tripping fork 110 is also in its short position and linear lever 125 is in its short indication position. Thus, in some embodiments, the state of switching faceplate 805 as shown in FIG. 8C corresponds to the state of system 100 in FIG. 2 and FIG. 5.

Figure 9:
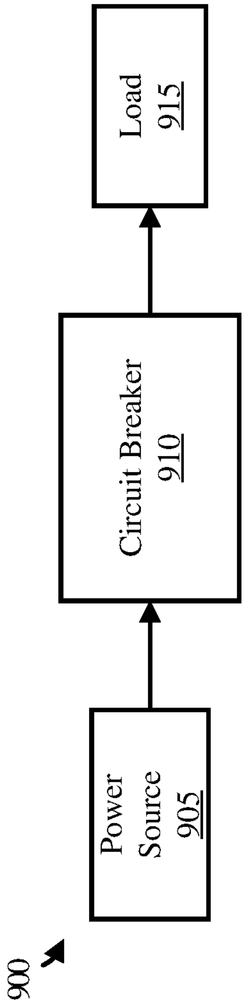
FIG. 9 illustrates an example of a circuit, according to some embodiments.

FIG. 9 illustrates circuit 900 in which a circuit breaker in accordance with the present disclosure may be implemented. Circuit 900 includes power source 905, circuit breaker 910, and load 915. Circuit 900 may include fewer or additional components as compared to what is shown in the example of FIG. 9.

Power source 905 is representative of any device or electrical component delivering power into circuit 900. Power source 905 may be an independent voltage source, a dependent voltage source, or other type of voltage source. Examples of such power sources include generators, photovoltaic cells, thermopiles, primary-cell batteries, a power grid, and the like. Power source 905 creates electrical voltage that causes current to flow through circuit 900 via one or more connecting wires or other connection components. Load 915 is representative of any device or electrical component that consumes electrical energy. Load 915 may represent a resistive load, inductive load, capacitive load, or combined load. Examples of loads include electric lamps, air conditioners, motors, resistors, heaters, processors, precision manufacturing equipment, data servers, pumps, fans, generators, robotic machinery, industrial automation controllers, and the like. Circuit breaker 910 is representative of any circuit breaker in accordance with the technology disclosed herein. For example, circuit breaker 910 may be representative of system 100 from the preceding figures. Circuit breaker 910 may alternatively be representative of a circuit breaker system that differs from system 100 but includes at least one tripping fork and linear lever mechanism or similar components that operates in a similar manner to the tripping fork and linear lever mechanisms of system 100.

In accordance with the example of FIG. 9, current flows from power source 905 to load 915. Circuit breaker 910 protects circuit 900, including power source 905 and load 915, by stopping the flow of current in cases of short circuit or overload. Thus, in accordance with the present disclosure, circuit breaker 910 is a circuit breaker that may include, for example, thermal tripping elements, magnetic tripping elements, microprocessor tripping elements, electronic tripping elements, or a combination thereof. Circuit breaker 910 further includes one or more tripping forks, such as tripping fork 105 and tripping fork 110 from the preceding figures, configured to initiate an indication that a thermal or magnetic trip occurred. Circuit breaker 910 may open circuit 900 to stop current flow when an overcurrent condition or short circuit condition occurs.

The above description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Unless the context clearly requires otherwise, throughout the description and the claims, the words "include," "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description is not intended to be exhaustive or to limit the technology to the precise form disclosed above. While specific examples of the technology are described for illustrative purposes, various equivalent modifications are possible within the scope of the technology, as those skilled in the relevant art will recognize. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in several ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A circuit breaker comprising:

a tripping fork comprising a contact surface, wherein:

the tripping fork shifts between a no-trip position and a tripped position, the no-trip position is in a first plane, the tripped position is in a second plane different than the first plane, the contact surface physically contacts a first end of a linear lever in the no-trip position, and the contact surface does not physically contact the first end of the linear lever in the tripped position;

the linear lever comprising the first end of the linear lever, wherein:

the linear lever is held in a disengaged position by the contact surface of the tripping fork physically contacting the first end of the linear lever when the tripping fork is in the no-trip position, and the linear lever slides in a third plane in a first direction into a trip indication position in response to the tripping fork shifting from the no-trip position to the tripped position;

trip indication componentry triggered by the linear lever sliding into the trip indication position, wherein the trip indication componentry provides an indication of a tripped state of the circuit breaker to an output; and the output comprising an auxiliary port.

2. The circuit breaker of claim 1, wherein:

the linear lever further comprises a second end of the linear lever coupled to a spring; and the spring exerts a force on the linear lever that pushes the linear lever into the trip indication position in response to the tripping fork shifting from the no-trip position to the tripped position.

3. The circuit breaker of claim 2, further comprising a rotary toggle comprising a pushing element on a circumferential edge of the rotary toggle, wherein:

the pushing element pushes the linear lever from the trip indication position to the disengaged position in response to the rotary toggle rotating in a first direction; and pushing the linear lever to the disengaged position comprises compressing the spring.

4. The circuit breaker of claim 1, further comprising a latch lever triggered by a latch, wherein:

the latch lever pushes the tripping fork from the no-trip position to the tripped position in response to the latch triggering the latch lever; and the latch triggers the latch lever in response to a thermal overload in the circuit breaker.

5. The circuit breaker of claim 1, further comprising a faceplate, wherein the faceplate comprises the auxiliary port.

6. The circuit breaker of claim 1, further comprising:

a second tripping fork comprising a second contact surface, wherein:

the second tripping fork shifts between a no-short position and a short position, the no-short position is in the first plane, the short position is in the second plane, the second contact surface physically contacts a first end of a second linear lever in the no-short position, and the second contact surface does not physically contact the first end of the second linear lever in the short position;

the second linear lever comprising the first end of the second linear lever, wherein:

the second linear lever is held in a second disengaged position by the second contact surface of the second tripping fork physically contacting the first end of the second linear lever when the second tripping fork is in the no-short position, the second linear lever slides in the third plane in the first direction into a short indication position in response to the second tripping fork shifting from the no-short position to the short position;

short indication componentry triggered by the second linear lever sliding into the short indication position, wherein the short indication componentry provides an indication of a magnetic trip to a second output; and the second output comprising a second auxiliary port.

7. The circuit breaker of claim 6, further comprising a latch lever triggered by a latch, wherein:

the latch lever pushes the tripping fork from the no-trip position to the tripped position in response to the latch triggering the latch lever; and the latch triggers the latch lever in response to a magnetic trip in the circuit breaker.

8. The circuit breaker of claim 6, wherein the linear lever slides in the third plane in the first direction into the trip indication position in response to the tripping fork shifting from the no-trip position to the tripped position.

9. The circuit breaker of claim 6, wherein:

the second linear lever further comprises a second end of the second linear lever coupled to a second spring; and the second spring exerts a force on the second linear lever that pushes the second linear lever into the short indication position in response to the second tripping fork shifting from the no-trip position to the tripped position.

10. The circuit breaker of claim 9, further comprising a rotary toggle comprising a pushing element on a circumferential edge of the rotary toggle, wherein:

the pushing element pushes the linear lever from the trip indication position to the disengaged position in response to the rotary toggle rotating in a first direction;

pushing the linear lever to the disengaged position comprises compressing the spring; and the linear lever comprises a pushing element that pushes the second linear lever from the short indication position to the second disengaged position in response to the rotary toggle rotating in the first direction, wherein pushing the second linear lever to the second disengaged position comprises compressing the second spring.

11. The circuit breaker of claim 6, further comprising one or more magnetic plungers coupled to the second tripping fork, wherein:

the second tripping fork shifts from the no-short position to the short position in response to the one or more magnetic plungers moving; and the one or more magnetic plungers move in response to a magnetic field generated in response to a short circuit.

12. The circuit breaker of claim 6, further comprising a faceplate comprising a second opening, wherein the second auxiliary port is accessible via the second opening on the faceplate of the circuit breaker.

13. A method of operating a circuit breaker, the method comprising:

holding, via a contact surface of a tripping fork that physically contacts a first end of a linear lever when the tripping fork is in a no-trip position, the linear lever in a disengaged position when the circuit breaker is closed;

in response to a trip occurring in the circuit breaker, shifting the tripping fork from the no-trip position to a tripped position, wherein:

the no-trip position is in a first plane and shifting the tripping fork from the no-trip position to the tripped position comprises shifting the tripping fork relative to the first plane; and the contact surface of the tripping fork does not contact the first end of the linear lever when the tripping fork is in the tripped position;

in response to shifting the tripping fork from the no-trip position to the tripped position, pushing, via a spring coupled to a second end of the linear lever, the linear lever in a second plane in a first direction into a trip indication position, wherein the spring is compressed when the linear lever is in the disengaged position and the spring is extended when the linear lever is in the trip indication position; and in response to the spring pushing the linear lever into the trip indication position, providing an indication of the trip to an output of the circuit breaker via trip indication componentry.

14. The method of claim 13, wherein:

the trip is a thermal trip;

shifting the tripping fork from the no-trip position to the tripped position occurs in response to the thermal trip;

pushing the linear lever into the trip indication position occurs in response to the thermal trip; and providing the indication of the trip to the output of the circuit breaker comprises providing an indication that the trip is the thermal trip.

15. The method of claim 13, wherein:

shifting the tripping fork from the no-trip position to the tripped position comprises pushing, by a latch lever, the tripping fork from the no-trip position to the tripped position in response to the trip occurring in the circuit breaker; and pushing the tripping fork from the no-trip position to the tripped position comprises moving the latch lever in response to an overload.

16. The method of claim 13, further comprising resetting the circuit breaker after the trip, wherein:

resetting the circuit breaker after the trip comprises rotating a rotary toggle in a first direction about a first axis via a rotary switch, the rotary toggle comprises a pushing element on a circumferential edge of the rotary toggle that pushes the linear lever from the trip indication position to the disengaged position as the rotary toggle rotates in the first direction, and pushing the linear lever to the disengaged position comprises compressing the spring.

17. The method of claim 13, wherein the output comprises an auxiliary port on a faceplate of the circuit breaker.

18. The method of claim 13, further comprising:

holding, via a second contact surface of a second tripping fork that physically contacts a first end of a second linear lever when the second tripping fork is in a no-short position, the second linear lever in a second disengaged position when the circuit breaker is closed and in response to the trip occurring in the circuit breaker, wherein the trip is a thermal trip;

in response to a magnetic trip occurring in the circuit breaker, shifting the second tripping fork from the no-short position to a short position, wherein:

the no-short position is in the first plane and shifting the second tripping fork from the no-short position to the short position comprises shifting the second tripping fork relative to the first plane; and the second contact surface of the second tripping fork does not contact the first end of the second linear lever when the second tripping fork is in the short position;

in response to shifting the second tripping fork from the no-short position to the short position, pushing, via a second spring coupled to a second end of the second linear lever, the second linear lever in the second plane in the first direction into a short indication position, wherein the second spring is compressed when the second linear lever is in the second disengaged position and the second spring is extended when the second linear lever is in the short indication position; and in response to the second spring pushing the second linear lever into the short indication position, providing a second indication of the magnetic trip to a second output of the circuit breaker via short indication componentry.

19. The method of claim 18, further comprising, in response to the magnetic trip occurring in the circuit breaker, shifting the tripping fork from the no-trip position to the trip position.

20. The method of claim 18, further comprising, in response to the magnetic trip occurring in the circuit breaker, pushing the linear lever into the trip indication position.

* * * * *